(12) United States Patent
Chabanne et al.

(10) Patent No.: US 9,847,879 B2
(45) Date of Patent: Dec. 19, 2017

(54) PROTECTION AGAINST PASSIVE SNIFFING

(75) Inventors: Hervé Chabanne, Paris (FR); Julien Bringer, Paris (FR); Thanh Ha Le, Paris (FR)

(73) Assignee: MORPHO, Issy-les-Moulineaux (FR)

( * ) Notice: Subject to any disclaimer, the term of this patent is extended or adjusted under 35 U.S.C. 154(b) by 2 days.

(21) Appl. No.: 13/883,933

(22) PCT Filed: Nov. 8, 2011

(86) PCT No.: PCT/FR2011/052602
§ 371 (c)(1),
(2), (4) Date: May 7, 2013

(87) PCT Pub. No.: WO2012/062994
PCT Pub. Date: May 18, 2012

(65) Prior Publication Data
US 2013/0230170 A1 Sep. 5, 2013

(30) Foreign Application Priority Data

Nov. 8, 2010 (FR) .................... 10 59208

(51) Int. Cl.
*H04L 29/06* (2006.01)
*H04L 9/28* (2006.01)
*H04L 9/00* (2006.01)

(52) U.S. Cl.
CPC ............... *H04L 9/28* (2013.01); *H04L 9/003* (2013.01); *H04L 2209/04* (2013.01); *H04L 2209/56* (2013.01)

(58) Field of Classification Search
CPC ......... H04L 9/28; H04L 9/003; H04L 9/0002; H04L 2209/04; H04L 2209/56
See application file for complete search history.

(56) References Cited

U.S. PATENT DOCUMENTS

| | | | |
|---|---|---|---|
| 7,292,693 B1* | 11/2007 | Mittenthal | 380/263 |
| 2004/0071291 A1* | 4/2004 | Romain et al. | 380/43 |
| 2005/0232430 A1 | 10/2005 | Gebotys | |

(Continued)

FOREIGN PATENT DOCUMENTS

| | | |
|---|---|---|
| EP | 2 020 773 A2 | 2/2009 |
| FR | 2 941 342 A1 | 7/2010 |
| WO | WO-2008/064704 A1 | 6/2008 |

OTHER PUBLICATIONS

Schneier, Bruce. "Applied Cryptography." 1996. Second ed. 421-422.*

(Continued)

*Primary Examiner* — Kendall Dolly
(74) *Attorney, Agent, or Firm* — Marshall, Gerstein & Borun LLP

(57) ABSTRACT

The invention relates in particular to a method for securing the execution of a cryptographic algorithm (ALG) against passive sniffing, the method implementing masking (MSK) of data processed by the cryptographic algorithm. The masking (MSK) of said data includes a linear encoding step such as $x'=x \cdot L+c$, in which x is the data to be masked, x' is the corresponding masked data, c is a code word included in a linear code C, and L is a matrix made up of linearly independent vectors not included in the linear code C. The invention also relates to a device (SC) implementing such a method.

20 Claims, 1 Drawing Sheet

(56) References Cited

U.S. PATENT DOCUMENTS

2006/0002548 A1\*   1/2006  Chu .............................. 380/28
2006/0056622 A1     3/2006  Liardet et al.
2008/0260145 A1\*  10/2008  Trichina ......................... 380/46
2009/0034724 A1     2/2009  Liardet et al.
2012/0250854 A1    10/2012  Danger et al.

OTHER PUBLICATIONS

Messerges, "Securing the AES Finalists Against Power Analysis Attacks," 7th International Workshop, FSE 2000 New York, NY, USA, Apr. 10-12, 2000 Proceedings, pp. 150-164.
Federal Information Processing Standards Publication No. 197, Nov. 26, 2011.
Daemen et al., "The Rijndael Block Ciper," AES proposal, National Institute of Standards, 2002.
Joye et al., "On Second-Order Differential Power Analysis," Cryptographic Hardware and Embedded Systems—CHES 2005, Lecture Notes in Computer Science 3659, pp. 293-308, 2005.
International Search Report for PCT/FR2011/05262, dated Feb. 16, 2012.
Schiefloe, Paul, "Cryptography, Hill-ciphers, an application of Linear Algebra," Dec. 3, 2001, retrieved from the internet at https://www.math.washington.edu/~king/coursedir/m308a01/Projects/Cryptography.htm on Aug. 3, 2016.

\* cited by examiner

PROTECTION AGAINST PASSIVE SNIFFING

FIELD OF THE INVENTION

The invention relates to the protection of cryptographic algorithms against passive sniffing.

BACKGROUND OF THE INVENTION

A cryptographic algorithm is an algorithm that aims to protect information, for example by ensuring its confidentiality, its authenticity, or its integrity, through mathematics. A cryptographic algorithm is often based on one or more keys, which can be secret, private, or public. Some cryptographic algorithms do not use a key, which is true for certain hash functions (such as SHA-1, MD5, SHA-256, RIPEMD-160, etc.). Cryptographic algorithms include encryption algorithms (which render information unintelligible) and decryption algorithms (which recover the original information from encrypted information), algorithms for e-signature, signature verification, authentication and authentication verification, etc. Some of the cryptographic algorithms which are key-based are referred to as symmetric (for example the algorithms DES, 3DES, AES, RC4, HMAC, etc.). Some symmetric algorithms are specialized (for example the HMAC algorithm is used for signature/signature verification, but not for encryption/decryption). Symmetric algorithms derive their name from the fact that they use the same key (generally referred to as a secret key) for encryption and decryption, or for signing or verifying a signature, etc. Symmetric cryptographic algorithms therefore require that the two parties using them secure their communications using shared keys. The AES (Advanced Encryption Standard) algorithm is significant because this is the algorithm that was chosen in 2000 by NIST to become the standard symmetric encryption algorithm for the government of the United States of America. Other cryptographic algorithms are referred to as asymmetric (for example DSA, RSA, elliptic curve and other algorithms) because a different key is used by the parties to a communication. Each party has a private key and an associated public key. For example, one party can use one of its private keys to sign a piece of information and the corresponding public key is used by the other party to verify the signature, or one party can use the public key belonging to another party to encrypt a piece of information, and the other party can then use its corresponding private key to decrypt the piece of information.

Cryptographic algorithms are often described in a very precise manner in specifications accessible to everyone, as the security of a cryptographic algorithm is generally not related to any secrecy in how it operates (algorithms which are assumed to be secure due solely to their secrecy are often ultimately cracked by reverse engineering). The specifications determine what an algorithm must produce as output when it is provided with certain information as input. This ensures the interoperability of the cryptographic algorithm, meaning that different implementations must function reciprocally. For example, one can reasonably expect that information encrypted by any implementation of an encryption algorithm should be decrypted by any implementation of the corresponding decryption algorithm. This does not mean that there is only one possible implementation of each cryptographic algorithm, however. Quite the contrary: there are many possible implementations of each cryptographic algorithm, and there are a multitude of different ways to perform the same calculation. For example, in order to calculate $X^2+2X+1$, it is possible to first calculate $X*X$, then $2*X$, then add these two terms and then add 1, or to calculate $X+1$, multiply the result by $X$, and then add 1, or even to calculate $X-1$ and square the result.

One might think that the security of a cryptographic algorithm depends only on its mathematical definition (and any keys that are used, whether secret or private) as disclosed in the specification, and not on the exact method which is used to calculate the result defined in the specification. In reality, this is generally not so. It turns out that the security of a particular implementation of a cryptographic algorithm depends not only on the actual cryptographic algorithm, but also on the manner in which it is implemented and on other factors such as the characteristics of the electronic device used to execute it.

In particular, it is well known that when an unprotected electronic device runs software implementing a cryptographic algorithm in a "naive" manner, meaning that it does no more than simply produce the numerical result expected according to the specification (such as an encryption result) from a given input, it is generally possible to perform passive electronic eavesdropping or sniffing of the electronic device and to obtain critical information about the cryptographic algorithm's execution. The advantage of passive sniffing is that it is non-invasive. The electronic device is not damaged, and its owner may not necessarily be aware that he was attacked. The device could have been appropriated and returned without the owner suspecting it, or simply used in the owner's absence, or even spied upon in the presence of the owner without the owner being aware (for example by a module concealed between the electronic device and its power source). Therefore, the owner of an electronic device from which a private RSA key was extracted by an attacker is not led to revoke his pair of RSA keys, as there is no reason to suspect an attack. The attacker can then freely use the RSA private key until the owner finally realizes that operations he had not performed (for example electronic funds transfers, or electronic signature of contracts) have been attributed to him, or that a third party has clearly had access to confidential information (for example multiple occurrences of the same competitor underbidding on requests for proposals by a very small amount).

Passive sniffing can consist, for example, of analyzing electromagnetic radiation emitted by the device while it executes the software (for example as part of a TEMPEST attack, which is generally focused on capturing emanations from CRT displays but can be more general). Indeed, electromagnetic radiation from an electronic device, for example a processor, depends on what the processor is currently executing, such as an instruction the processor is currently executing or data the processor is currently processing. It is also possible to analyze other types of information, such as the instantaneous power consumption of an electronic device, and use this to distinguish what tasks are being performed based on the electrical power required by these tasks. It is also possible to measure emitted vibrations (some components are susceptible to vibrating differently depending on what is being performed), as well as temperature variations, etc.

Passive sniffing can also include an analysis of the time required to execute certain operations. Passive sniffing draws conclusions from this analysis, when these operations are not protected against attacks referred to as "timing attacks". For example, a password verification operation unprotected against timing attacks might compare the bytes of a submitted password with the bytes of the expected password, byte by byte, and return an error when a byte is different. Based on the time required for the verification function to respond that the password is incorrect, an attacker could deduce that the first N bytes are correct, and retry by submitting a probable password with only the N+1 byte modified, until the response time slows down somewhat which would indicate that the N+1 byte is now correct, at which point he would move on to the N+2 byte, and so on until the complete password is obtained. Here, in order to guess a password having a length K (in bytes), even when it is a strong password (dictionary attacks not possible), the average complexity decreases from $\frac{1}{2}*(2^8)^K$ to a much simpler average complexity of $K*2^7$. In order to avoid timing attacks, it is possible to ensure that all sensitive operations have a constant execution time, or that although the duration may be variable it provides no information on what is occurring during the operation. Additional countermeasures are also possible: in the previous example, the password could be blocked after a certain number of failed attempts, which is the usual approach with PIN codes. However, generally these additional measures are merely a supplemental protection against timing attacks, not a substitute. For example, assuming that a bank card blocks a PIN code after five unsuccessful attempts but implements an unprotected verification as described above, someone (for example a teenager, an employee, etc.) could appropriate a bank card (for instance from his mother, his boss, etc.) each time the legitimate owner has made a transaction, for example payment for a business lunch in a restaurant (which resets the counter of unsuccessful attempts), and can then make four attempts each time. For a four-digit PIN code, it would thus take an average of twenty attempts (meaning that the card would have to be taken 5 times), and a maximum of forty attempts to find the PIN code, which would be fairly easy to carry out.

Basic sniffing can consist of simply identifying a specific characteristic from a specific measurement on the targeted electronic device. This is the case for example with so-called SPA (Simple Power Analysis) attacks. For example, in a modular exponentiation performed in a "naive" implementation of the RSA algorithm, the consumption of electricity is very different when a bit of the exponent is equal to 1 (high consumption) and when a bit is equal to 0 (lower consumption). In fact, in common implementations, a bit at 1 involves both a square operation and a multiplication operation (called "square and multiply"), while a bit at 0 only involves a square operation. By observing the trace of electricity consumption during modular exponentiation, one can thus identify series of 1s and 0s in the exponent which correspond to the fluctuations in the electricity consumption. The RSA exponent, in the case where this concerns a private exponent, is extremely confidential data that is a component of the private RSA key, which in general is not supposed to be known to anyone outside of the electronic device. Obtaining a person's private signature key thus allows signing in his name, and obtaining his private decryption key allows decrypting his messages.

However, these sniffing attempts (easy to implement) are not always effective. More elaborate sniffing techniques are known, such as the so-called DPA (Differential Power Analysis) techniques in which an attacker repeatedly executes a cryptographic algorithm, recording the traces produced each time (for example the power traces). Then the attacker makes statistical calculations based on multiple records and obtains information in a manner which is more reliable and more difficult to prevent.

To guard against such attacks, it is possible to add security measures to the electronic device itself. For example, noise can be superimposed onto the supplied power to make its analysis more difficult, the power consumption can be smoothed (for example with capacitors), the electromagnetic emissions can be limited by appropriate shielding, etc. It is also possible to use a special internal clock operating at a randomly selected variable frequency, which renders such measures difficult to use (because the operations of the cryptographic algorithms are then performed at a rate which keeps changing and which is not known to the attacker in advance). There are also other techniques, for example consisting of controlling the physical access and/or logical access to the electronic device. For example, smart cards implementing private key cryptographic algorithms generally protect relevant operations by a PIN code. A person who temporarily steals a smart card, hoping to extract the private key and then return the card without the owner being aware of this, would not be able to execute the relevant algorithm without providing the correct PIN (which an informed user knows by heart and does not reveal to anyone), and would thus not be able to carry out the attack.

These countermeasures are extremely useful, but are generally insufficient by themselves because they do not protect against all possible attack scenarios. Another protection method consists of using a security measure, with the cryptographic algorithm, which consists of implementing the algorithm in such a way that it generates minimum fluctuations (electrical or other fluctuations).

For example, it is possible to modify the implementation of a private key-based RSA algorithm so that it performs operations having the same signature (electric, electromagnetic, etc.) for a 1 bit or for a 0 bit in the private exponent of the private key. For example, it is possible to perform a square and multiply in all cases, and only use the result of the multiplication operation when the bit is 1. One obviously has to be very vigilant, and have the implementation to be as symmetrical as possible. For example, if there is a test that verifies whether or not the result of the multiplication should be used, this test must behave in the same manner regardless of its result (or at least in as similar a manner as possible), because passive sniffing could otherwise target this test to determine whether the bit is at 0 or at 1.

Another security measure (which can be used to supplement the previous one) consists of masking sensitive data. Sensitive data can be, for example, cryptographic keys, and/or an input message that is to be encrypted for example with the cryptographic algorithm, and/or certain intermediate data manipulated during the execution of the cryptographic algorithm. In some cases the attacker may know or choose an input message to be processed by the cryptographic algorithm, and can then make much more precise predictions concerning the current calculation. As the input message and/or intermediate data are masked in a manner that, in principle, is unpredictable by the attacker, this takes some of the information away from the attacker and can therefore significantly complicate the attack. Moreover, provided that the masking is different for each use of the cryptographic algorithm, the statistical analysis can be complicated. For example, several methods which protect by masking the AES algorithm have been proposed to protect against side-channel attacks. One traditional solution is additive masking, where the manipulated data x is replaced with masked data x+m (+ denoting here the exclusive OR). This easily passes through the linear operations of the algorithm. The substitution (nonlinear) tables S[ ] are then replaced with masked tables generated on the fly after drawing a new mask (or all pre-stored in memory if the amount of memory permits this). In this manner, a masked nonlinear operation corresponding to a masked substitution table S'[ ], applied to data x masked by a random mask m1, can be written in the following form:

$$y'=S'[x+m_1]=y+m_2=S[x]+m_2$$

where $m_2$ is a corresponding random mask which masks the output value of the substitution table. At the end of the algorithm, the result is unmasked to obtain the final result (the original data, encrypted and unmasked).

Nevertheless, attacks will sometimes successfully overcome the difficulties introduced by prior art masking. In particular, some types of attacks such as HO-DPA (High Order Differential Power Analysis) attacks can be especially difficult to avoid under certain circumstances. This is explained in particular in the article "On Second-Order Differential Power Analysis" by Marc Joye, Pascal Paillier and Berry Schoenmakers, published in Cryptographic Hardware and Embedded Systems, CHES 2005, Lecture Notes in Computer Science 3659 (2005), 293-308, Springer Verlag. Therefore, when an attacker successfully correlates power consumption (or other information of this type) with calculations multiple times, he can sometimes overcome the masking.

SUMMARY OF THE INVENTION

The invention improves this situation.

The invention relates to a method for securing the execution of a cryptographic algorithm against passive sniffing, said method carrying out a masking of data processed by the cryptographic algorithm. The masking of said data includes a transformation step of the type x'=x·L+c, where x is data to be masked (such as input data to the cryptographic algorithm, intermediate sensitive data, or a key), x' is the corresponding masked data, c is a codeword included in a linear code C, and L is a matrix consisting of linearly independent vectors not included in the linear code C. The method may consist of a modified implementation of the algorithm, for example modified into a functionally equivalent algorithm (meaning it produces the same output for the same input) which includes at least one step of masking by transformation (such as linear encoding), and at least one corresponding step of unmasking by decoding. The implementation may be in the form of a software implementation. It may also be an implementation in electronic form, for example a micro-coded implementation, FPGA implementation, ASIC implementation, or implementation by development of an ad-hoc circuit. The software implementation is generally the easiest form to carry out, but it is often less efficient in terms of speed of execution.

The method is advantageous because it provides a more effective protection against passive sniffing attacks. Moreover, unlike traditional masking (such as a one-time pad), the same mask can be used multiple times. When the same mask is used multiple times (in a one-time pad), this often allows the attacker to overcome the mask. With the masking proposed by the invention, however, the same mask can be used multiple times as long as the number of intercepted positions remains under a given security limit.

The method is also advantageous in that the transformation of type x·L+c allows detecting certain faults, mainly at the end of the algorithm (but it is also possible to perform fault detection during the algorithm). In fact, if c is known, upon receipt of a result y, it is possible to verify that y+c indeed has the form x·L for a certain x.

According to one embodiment, the codeword c is chosen at random during each execution of the cryptographic algorithm. Modifying the codeword c makes a possible attack more complex, and it is advantageous when it is not reused very often.

According to one embodiment, the matrix L is randomly chosen one time only for all executions of the cryptographic algorithm. This is advantageous because the generation of this matrix is typically quite slow, which can be a disadvantage because of its impact on the computation speed if it is repeated too often. The code word c already adds a certain variability, which makes the attack very complex. However, it may be appropriate to change the matrix L from time to time (for increased security). For example, one could generate a new matrix L each time the device making use of the securing method is powered on, in cases of devices which are generally left on for a considerable period of time. In the case of a typical smart card, this would not be very relevant because smart cards are rarely equipped with a battery or other source of electrical energy, and are therefore typically powered off at the end of each transaction (a transaction is generally concluded by removing the card from a terminal). It would be possible to provide a smart card with a counter that is incremented each time it is powered on, and to generate a new matrix each time the counter reaches a certain threshold (for example the value of 20). It is also possible to have a new matrix generated when the card is used in certain contexts. For example, when a smart card is completely swallowed inside an ATM machine and the transaction takes a long time, even if only due to the mechanical constraints of counting out the bills, this time could be utilized to generate a new matrix. Or when a smart card using contactless technology and serving as a ticket on public transport (metro/bus, etc.) is topped up, for example once a month. Conversely, during a quick transaction (for example when a contactless bank card is used to buy a loaf of bread in a bakery or to pay the toll on a highway, or when a contactless smart card is used to pass through a subway gate), it would undoubtedly be inappropriate to generate a new matrix unless much faster communication protocols are developed than those currently known. The discrimination between financial transactions could be based, for example, on their amount (for example, it could be decided that a new matrix is not generated for transactions of less than 15 Euros). It would be also possible to use special fields for recognizing transaction types, although, depending on the context, this could involve unacceptable architectural changes (for example in bank computer networks, which are in general highly standardized).

According to one embodiment, the masking (and therefore the transformation) is performed before the cryptographic algorithm is applied (namely the cryptographic algorithm before it is protected by the method of this invention), and an unmasking operation is performed after the cryptographic algorithm is applied. This is advantageous because the cryptographic algorithm then operates in masked mode from end to end. However, it is also possible to focus only on certain parts of the cryptographic algorithm (for example masking only certain very sensitive routines). It is possible to mask only the linear operations, which are rewritten accordingly (typically f(x·L)=f(x)·L), which allows minimizing the changes to the cryptographic algorithm, although the security is then sometime somewhat degraded. The unmasking can be done by decoding, for example by applying a parity check matrix for the linear code.

According to one embodiment, the cryptographic algorithm is an algorithm which implements a nonlinear operation (such as an S-Box of the DES algorithm or of Blowfish, or a nonlinear operation of the AES algorithm). The nonlinear operation S is replaced with a nonlinear operation S' such that $S'(x \cdot L+c)=S(x) \cdot L+c'$, where c' is a codeword of the linear code C. In fact, almost all cryptographic algorithms make use of nonlinear operations because a linear algorithm has properties that generally make it very predictable, which is typically the opposite of what is expected of a cryptographic algorithm. For example, if an encryption algorithm is linear, it would be possible to know the encryption of the sum of two messages if the encryption of each message is known, which is in principle unacceptable. This embodiment is thus useful for ensuring end-to-end security in a nonlinear cryptographic algorithm, because it solves the problem of unmasking when nonlinear operations are present, which is very often the case.

According to one embodiment, the cryptographic algorithm includes several rounds, each round including the same nonlinear operation S, and the linear operation S is replaced with the same nonlinear S' during each round. This is advantageous because replacing a nonlinear operation by another operation which is different for each round is costly in terms of performance, while keeping the same one makes it possible to maintain an acceptable speed particularly for devices which have limited resources, such as entry-level smart cards having a very slow processor and not much memory.

In the two previous embodiments, it can be arranged to determine a nonlinear operation S' such that c'=c, which simplifies the unmasking operation. It is in any event necessary to unmask what was masked, so that the secure cryptographic algorithm can produce the same result as the cryptographic algorithm without the added security.

The invention also relates to an electronic device including a unit for executing the cryptographic algorithm (the cryptographic algorithm execution unit) as well as an associated masking module. The masking module is configured to apply a transformation of the type $x'=x \cdot L+c$, where x is data to be masked, x' is the corresponding masked data, c is a codeword included in a linear code C, and L is a matrix consisting of linearly independent vectors not included in the linear code C.

The embodiments described above with respect to the method can be transposed to the device; in particular, according to one embodiment, the masking module is arranged to choose a codeword c randomly during each execution of the cryptographic algorithm. According to one embodiment, the masking module chooses the matrix L randomly one time only for all executions of the cryptographic algorithm. According to one embodiment, the masking module is arranged to perform the masking before the cryptographic algorithm is applied, and to perform an unmasking operation after the cryptographic algorithm is applied. According to one embodiment, the cryptographic algorithm of the execution unit is an algorithm implementing a nonlinear operation S, and the masking module is arranged to replace the nonlinear operation S with a nonlinear operation S' such that $S'(x \cdot L+c)=S(x) \cdot L+c'$, where c' is a codeword of the linear code C. According to one embodiment, the cryptographic algorithm of the execution unit includes several rounds, each round comprising the same nonlinear operation S, and the masking module is arranged to replace the nonlinear operation S with the same nonlinear operation S' during each round. According to one possible embodiment of the two previous embodiments, c'=c.

Other aspects, features and advantages of the invention will become apparent from reading the description of one of its embodiments.

BRIEF DESCRIPTION OF THE DRAWINGS

The invention will be also better understood with reference to the drawings, which show the following.

DETAILED DESCRIPTION

Figure 1:
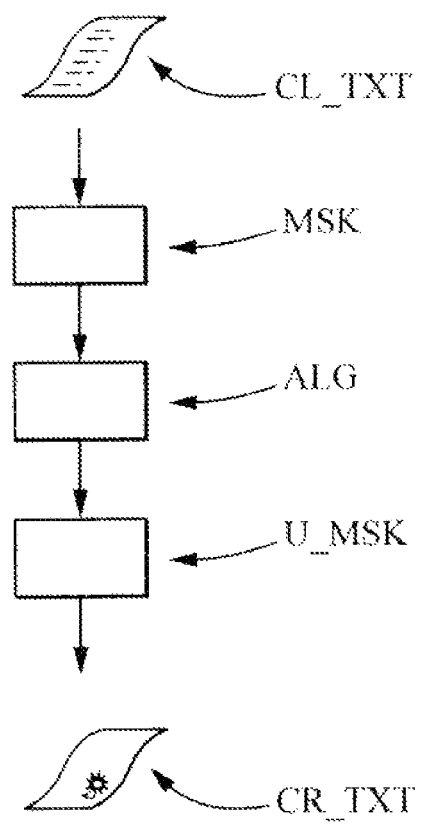
FIG. 1 illustrates a method according to the invention.

FIG. 1 shows a highly schematic outline of a method according to the invention. In this method, the process starts by masking the data CL_TXT (for "clear text"), for example a data item to be encrypted, during a step MSK, and the cryptographic algorithm ALG to be protected is then executed (for example an encryption algorithm such as AES), then the result is unmasked at the end (in step U_MSK, for "unmask") in order to restore the value CR_TXT (from "cipher text", or encrypted text) which would normally have been produced by the algorithm ALG without masking. In other words, if the two steps of masking MSK with a linear code and of unmasking U_MSK (by corresponding decoding) are eliminated so that only the cryptographic algorithm ALG is retained, the same output CR_TXT is obtained from the input CL_TXT, which means that the algorithm has been made more secure by masking it without affecting its interoperability. The masking operations MSK can be integrated with the unmasking operations U_MSK within the cryptographic algorithm, thus obtaining a particular implementation of the cryptographic algorithm ALG which is functionally the same as those of the prior art but which is much more secure against passive sniffing attacks, in particular against the most elaborate attacks such as HODPA attacks. The representation shown in FIG. 1 is simplified to the extent that in the most frequent cases, it is not exactly the known cryptographic algorithm ALG which is executed in step ALG, but a modified version of this algorithm, to enable masking/unmasking in the presence of nonlinear operations.

Figure 2:
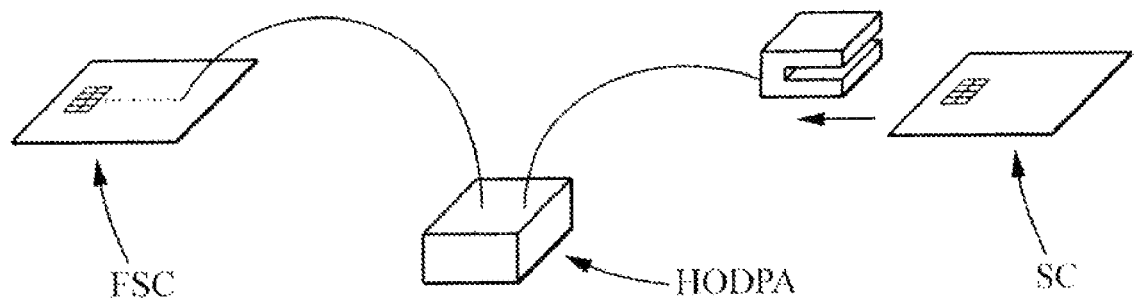
FIG. 2 illustrates a device according to the invention, as well as equipment used in attack attempts on this device.

FIG. 2 shows a smart card SC according to the invention. A smart card is a possible example of a device for which the invention is particularly advantageous, considering its many applications in the field of cryptography (SIM cards authenticating a mobile phone user to an operator, bank cards authenticating the card holder during a financial transaction, health insurance cards, etc.). However, the invention is applicable to any portable device, such as an electronic passport, an e-visa, an electronic driver's license, a secure USB key, a secure MMC card, a secure token, etc. The invention may be also applied in a personal computer, a server, an SSL accelerator, etc. Most personal computers are not secure, unlike a protected device such as a smart card. This makes computers vulnerable to attacks that are much easier to implement than the attacks the invention protects against, such as attacks that are strictly software-based. These software attacks (by a virus, a Trojan horse, etc.) can often be carried out remotely without requiring physical access. It might seem absurd to try to protect against complex and restrictive attacks such as passive sniffing attacks when an attacker located on another continent could take control of the computer remotely and retrieve critical information in a manner that is much easier and less dangerous for him (there is no intrusion, the device is not stolen, etc.). However, some personal computers (for example computers used in military environments) are highly protected against purely software-based attacks, and in this context it is advantageous to protect them against passive sniffing attacks as well.

FIG. 2 also shows a fake smart card FSC, which is merely a connector in the shape of a smart card and having electrical contacts at the standard positions so that these contacts are connected to the corresponding contacts of a real smart card SC via HODPA equipment, enabling an HODPA type of attack. The HODPA equipment is thus serially connected between the real smart card SC being targeted by an attacker, and a fake smart card FSC establishing the physical interface between the terminal that is supposed to accept the real smart card SC, and this real smart card SC. The purpose of the fake smart card FSC in this example is to spy on the current consumption of the smart card SC without having to modify the terminal using the card (and in particular the smart card reader). In the invention, the smart card SC is more resistant to attacks of this type and it is very difficult for HODPA equipment to extract the targeted information from the smart card SC.

As the invention is based on the use of a linear code, it is worthwhile to recall that linear code is a particular type of code for correcting errors. A linear code C is a vector subspace of an n-dimensional vector space $F_q^n$, where $F_q$ is the finite field with q elements. This can be field F2 (q=2), in which case the linear code is a binary code. Let us call n−k the dimension of the vector subspace corresponding to the linear code C. The linear code C is defined by a generator matrix G. The element c (and more generally any element of the code C) can be broken down into the linear combination form $c=m_1 v_1+m_2 v_2+ \ldots +m_{n-k} v_{n-k}$ of a vector basis $(v_1, v_2, \ldots, v_{n-k})$, or $c=mG$, where $m=(m_1, m_2, \ldots m_{n-k})$, G being the generator matrix (of size (n−k)*n). A parity check matrix is also defined of size n*k, such that for every element c of the linear code C, $c \cdot H=0$, and reciprocally if $c \cdot H=0$ then c is an element of the linear code C.

In general, m represents a message encoded by the linear code C. However, in the context of the invention, the codeword c does not need to represent a particular message. It can therefore be selected at random, in a manner similar to what is done in the coding employed for a wiretap channel. With a wiretap channel, the goal is to transmit a message from a sender to a receiver in the possible presence of a spy capable of intercepting the communications. It is assumed that the transmission channel is not perfect. The channel coding is arranged so that the message cannot be decoded by the attacker with the bit error rate in the intercepted message, while the message received by the receiver can be decoded with the bit error rate at the receiver.

According to one embodiment of the invention, data protected by the linear code are only used internally within the cryptographic algorithm. This means that there is no concept of a legitimate sender or a legitimate receiver of the data protected by wiretap channel coding, nor a concept of error rate. The linear code is used within the calculations of a cryptographic algorithm, which generally does not need to communicate with other entities during the execution of the actual algorithm. When the device is a multitasking device, this does not rule out the device communicating with the outside while it is executing the cryptographic algorithm. This also does not rule out the device implementing a secure protocol (such as a key exchange protocol, for example Diffie-Hellman, or a protocol based on symmetric cryptography), in which successive cryptographic operations are performed by two parties which progressively exchange the results of the secure protocol in order to obtain for example a common key at the end of the secure protocol. In this context, the invention can be used to protect each cryptographic operation performed under the protocol. A cryptographic algorithm may sometimes erroneously be referred to as a secure protocol such as the one described above. However, in the sense of this invention, this is not a cryptographic algorithm but a protocol which makes use of a succession of cryptographic algorithms. In a modified cryptographic algorithm there will generally be no voluntary transmission of data protected by channel coding through any communication channel. In principle, this means that there is no data loss, unless for example a fault-based attack is present (such as a DFA attack), or if a cryptographic algorithm is executed on a defective electronic device. With the exception of these particular situations, the channel can be considered a perfect virtual channel (because there is no actual transmission of masked data). However, there is a transmission channel for an attacker attempting a passive sniffing attack, which is the side channel used (for example electromagnetic transmissions or power consumption, spied on with an HODPA attack). This channel is not perfect, and it can generally even be considered to be relatively noisy and disrupted by the many countermeasures which are typically present in electronic devices.

According to one embodiment, in order to manipulate sensitive data x having k bits within a cryptographic algorithm while tolerating a leakage of at the most mu bits, one proceeds as follows:
  a linear code C is established having a generator matrix G of size (n−k)*n, and a parity check matrix H of size n*k such that all of its sub-matrices which have the size (n−mu)*k (namely sub-matrices having (n−mu) rows and k columns) will have the rank k,
  $L_1, L_2, \ldots L_k$ linearly independent k vectors are established which have n bits and which are not included in the linear code C,
  c=mG is chosen, a codeword which is randomly selected, the sensitive data x, represented in the form of a vector $(x_1, x_2, \ldots x_k)$, is then encoded as $x'=x \cdot L+c$, with $x \cdot L=x_1 \cdot L_1+ \ldots +x_k \cdot L_k$. In the case of a linear code C which is a binary code (field F2), the "+" operation can typically be an exclusive OR operation.

This embodiment is advantageous because it can tolerate a number of bits of leakage of up to mu=n−k for arbitrarily large n.

The sensitive data x can be, for example, clear text CL_TXT which is to be encrypted using the cryptographic algorithm ALG to be protected. However, it can also be other information, for example a cryptographic key manipulated during the algorithm ALG, or a subkey such as a round key. It can be also encrypted data which is to be decrypted with the cryptographic algorithm ALG (for example an AES algorithm), data (clear or encrypted) which is to be signed, or signed data for which the signature is to be verified, etc.

Given a generator matrix G for the linear code C, the random selection of a codeword from the linear code C can simply consist of randomly selecting a vector m in the vector space $F_q^{n-k}$, then calculating c=mG. This can be done each time the cryptographic algorithm is used.

In order to determine the k linearly independent vectors $L_1, L_2, \ldots L_k$ not included in the linear code C and which constitute the matrix L, a first vector $L_{test}$ can be randomly selected and then one can verify whether this vector is in the code by applying the parity check matrix H (or in other words by calculating $L_{test} H$). If the result is zero, then the vector $L_{test}$ is in the linear code C and the operation is repeated with a new random vector. Otherwise, $L_1=L_{test}$ is defined and the generation of vector $L_{test}$ is repeated until a new vector is found which is not in the linear code C, then an algorithm can be executed such as a Gaussian elimination algorithm in order to determine whether the vectors generated up until this point (here $L_1$ and the last $L_{test}$) are linearly dependent. If they are, the last generated vector $L_{test}$ is abandoned and a new one is randomly selected (until a vector $L_{test}$ is found which is not in the linear code C). If not, $L_2=L_{test}$ is defined and a new vector $L_{test}$ is randomly selected until it is not in the linear code, then a Gaussian elimination is calculated based on all the vectors generated up until this point ($L_1$ and $L_2$, which by design are known not to be linearly dependent, plus the last $L_{test}$), and so on until there are k independent vectors. These k linearly independent vectors $L_1, L_2, \ldots L_k$ can be chosen once and for all for each target device. For example, for a smart card, the vectors could be calculated (separately) for each smart card during the card personalization step of said smart card. They can be also regenerated from time to time, as was explained above.

The invention is particularly advantageous in the context of symmetric encryption/decryption algorithms such as the AES algorithm.

The main steps of a conventional AES algorithm (which is very well known from the prior art) are:
1. AddRK(K0)=AddRoundKey(K0)
2. for i from 1 to 9:
   (a) S=SubBytes;
   (b) SR=ShiftRows;
   (c) MC=MixColumns;
   (d) AddRK(Ki).
3. S;
4. SR;
5. AddRK(K10)

Thus after having executed, in a preliminary step not shown here, a key expansion operation in which the round keys K0 . . . K10 are derived from a given encryption key, we see the AddRoundKey operation which consists of combining each byte of the state with a round key (by means of an exclusive OR). After that, there is a succession of nine rounds, each round including the SubBytes operation (which is a nonlinear operation in which each byte is replaced with another byte using a substitution table), the ShiftRows operation, which implements a transposition during which each row of the state matrix is cyclically shifted, the MixColumn operation (which combines the four bytes of a column in each column of the state matrix), and finally the AddRoundKey operation already described above. At end of nine rounds, the AES algorithm again executes the SubBytes operation, which is followed by the ShiftRows operation, and then by the AddRoundKey operation.

According to one embodiment, the AES algorithm is protected from end to end in the following manner.

First, a preconfiguration is performed. Unlike the conventional additive masking of the prior art, the operations will be performed using intermediate variables in a different dimension than the one used for the intermediate variables of the conventional AES algorithm. This preconfiguration may be performed one time only (meaning only one time regardless of the number of times the AES algorithm will subsequently be used). The preconfiguration consists for example of generating new operations AddRK', SR', and MC', such that:
AddRK'(K)=AddRK(K)·L
SR'(x·L)=SR(x)·L
MC'(x·L)=MC(x)·L These calculations are easy to perform (and thus not very costly in terms of performance) because these are linear operations. This preconfiguration step can be performed for example in the factory, during the step of photomasking an electronic component that will implement this embodiment, the modified operations AddRK', SR' and MC' being for example stored in the ROM as part of a smart card operating system. It is also possible to run the AddRK', SR' and MC' operations electronically (for example as hardwired logic), which generally has the advantage of faster execution than when using software executed by a processor.

Next, a preliminary step is executed for each change of mask (this can be done for example each time the AES algorithm is used, or less frequently, in particular if a sufficiently large n parameter is chosen). The preliminary step can consist for example of randomly selecting two codewords c and c' and generating S' such that $S'(x\cdot L+c)=S(x)\cdot c'$ for all x (here the same S' is used for each round of the algorithm for reasons related to performance, although a different S' could very well be used for each round, which would provide a slight general increase in security).

Finally, a step is executed in which the data x is encrypted using the AES algorithm modified according to the invention, as follows:
0. calculate $x\cdot L+c$ from x
1. AddRK'(K0)
2. for i from 1 to 9:
   (a) S';
   (b) SR';
   (c) MC';
   (d) AddRK'(Ki)
   (e) x=x+c+MC'(SR'(c'))
3. S';
4. SR';
5. AddRK'(K10).
6. Apply the parity check matrix H to obtain the final result.

In this manner, masking is performed in step 0 using a linear code. In step 2(e), the masking is corrected to take into account the fact that the nonlinear operation uses a constant c' which is different from the one (constant c) used during the initial masking in step 9. In step 6, a projection of the resulting data is made using the parity check matrix. This eliminates all components which are in the linear code, and the data is thus recovered which would have been produced with the AES algorithm without the masking. In step 6, after the application of the parity check matrix H, it is then possible to perform the inversion of the resulting matrix $(x\cdot L)\cdot H$.

It is also possible to add a mask (another codeword) to the operations using the key (in particular the AddRK' operation), which further reinforces the masking by making it more difficult to attack. In this case, the step of encrypting the data x with the modified AES algorithm of the invention can then be performed as follows:
0. calculate $x\cdot L+c_1$ from x, where $c_1$ is a random codeword
1. AddRK'(K0)+$c_2$, with $c_1+c_2=c$
2. for i from 1 to 9:
   (a) S';
   (b) SR';
   (c) MC';
   (d) AddRK'(Ki)+$c_2$
   (e) x=x+$c_1$+MC'(SR'(c'))
3. S';
4. SR';

5. AddRK'(K10)+$c_3$, with random $c_3$.

6. Apply the parity check matrix H to obtain the final result.

The code can be chosen so as to minimize operation (e).

In some configurations, instead of performing step (e): x=x+c+MC'(SR'(c')), it is possible to apply in step (e) a function D(x, c) which takes x and the codeword c as input but not the word c'. This can be achieved for example by using a parity check matrix which is associated with the code including all MC'(SR'(cc)), where cc covers all words of the initial code. The advantage of this embodiment is that it eliminates the need to preserve the c' value.

A simple example implementation (in particular where SR' and MC' are deduced directly from SR and MC) corresponds to the case where x·L has the value [x, 0 . . . 0] (x followed by n−k zeroes).

Of course, the present invention is not limited to the example embodiment described above; it applies to other variants.

Therefore, although a method for securing a step of AES encryption was described above, it is also possible to secure an AES decryption step in the same manner. Moreover, although the described embodiment relates to the AES algorithm, the invention applies to all types of cryptographic algorithms, and in particular to the DES algorithm (and its 3DES variant) and to the RC4 algorithm, but also to asymmetric algorithms or to hash functions (such as SHA-1, MD5, SHA-256, or RIPEMD-160) in which it may be desirable to protect certain linear functions.

Furthermore, the method according to the invention does not exclude the use of other methods. For example, it is possible to combine the method according to the invention with other countermeasures such as the additive masking of the prior art. Such manipulated data can be classified, for example, by level of sensitivity, with the less sensitive data protected by a simple additive mask, the more sensitive data protected by masking according to the invention, and the most sensitive data protected with dual data masking (both the conventional additive masking and the masking according to the invention). All combinations are conceivable.

The invention claimed is:

1. A method for securing an electronic device executing a cryptographic algorithm against passive sniffing via a side channel based on analyzing a measurable physical parameter of the electronic device during operation, the method comprising:
masking data processed by the cryptographic algorithm, including applying a transformation step x'=x·L+c, where x is data to be masked, x' is the corresponding masked data, c is a codeword included in a linear code C, and L is a matrix consisting of linearly independent vectors not included in the linear code C; and
generating the measurable physical parameter of the electronic device by applying the cryptographic algorithm, wherein the measurable physical parameter is communicated via the side channel of the electronic device, and a third-party attacker is unable to correlate the measurable physical parameter with the data processed by the cryptographic algorithm.

2. The method according to claim 1, wherein the codeword c is chosen randomly during each execution of the cryptographic algorithm.

3. The method according to claim 1, wherein the matrix L is randomly chosen one time only for all executions of the cryptographic algorithm (ALG).

4. The method according to claim 1, comprising carrying out an unmasking operation after executing the cryptographic algorithm.

5. The method according to claim 1, wherein the cryptographic algorithm is an algorithm executing a nonlinear operation S, said nonlinear operation S being replaced with a nonlinear operation S' such that S'(x·L+c)=S(x)·L+c', where c' is a codeword of the linear code C.

6. The method according to claim 5, wherein the cryptographic algorithm comprises several rounds, each round comprising the same nonlinear operation S, and the nonlinear operation S is replaced with the same nonlinear operation S' during each round.

7. The method according to claim 5, wherein c'=c.

8. The method of claim 1, comprising transmitting the data processed by the cryptographic algorithm via a communication channel.

9. The method of claim 1, wherein the measurable physical parameter is one of emitted vibration, electromagnetic radiation, or temperature.

10. An electronic device comprising:
a processing unit; and
a memory storing instructions for securing execution of a cryptographic algorithm against passive sniffing via a side channel based on analyzing a measurable physical parameter of the electronic device during operation, wherein the instructions, when executed on the processing unit, cause the electronic device to:
mask data processed by the cryptographic algorithm, including apply a transformation x'=x·L+c, where x is data to be masked, x' is the corresponding masked data, c is a codeword included in a linear code C, and L is a matrix consisting of linearly independent vectors not included in the linear code C; and
generate the measurable physical parameter of the electronic device by applying the cryptographic algorithm, wherein the measurable physical parameter is communicated via the side channel of the electronic device, and a third-party attacker is unable to correlate the measurable physical parameter with the data processed by the cryptographic algorithm.

11. The electronic device according to claim 10, the instructions further causing the electronic device to choose the codeword c randomly during each execution of the cryptographic algorithm.

12. The electronic device according to claim 10, the instructions further causing the electronic device to choose the matrix L randomly one time only for all executions of the cryptographic algorithm.

13. The electronic device according to claim 10, the instructions further causing the electronic device to perform the masking before executing the cryptographic algorithm, to execute the cryptographic algorithm, and to perform an unmasking operation after executing the cryptographic algorithm.

14. The electronic device according to claim 10, wherein the cryptographic algorithm is an algorithm including a nonlinear operation S, the instructions further causing the electronic device to replace the nonlinear operation S with a nonlinear operation S' such that S'(x·L+c)=S(x)·L+c', where c' is a codeword of the linear code C.

15. The electronic device according to claim 14, wherein the cryptographic algorithm comprises several rounds, each round comprising the same nonlinear operation S, the instructions further causing the electronic device to replace the nonlinear operation S with the same nonlinear operation S' during each round.

16. The electronic device according to claim 14, wherein $c'=c$.

17. The electronic device of claim 10, wherein the electronic device includes a smart card.

18. The electronic device of claim 10, wherein the electronic device includes a personal computer.

19. The electronic device of claim 10, wherein the electronic device includes one of an electronic driver's license, an electronic passport, a secure Universal Serial Bus (USB) key, a secure multimedia (MMC) card, or a secure token.

20. The electronic device of claim 10, wherein the measurable physical parameter is one of emitted vibration, electromagnetic radiation, or temperature.

* * * * *